(Model.)

J. C. MILLER.
Extinguisher for Lamp Burners.

No. 237,766. Patented Feb. 15, 1881.

ATTEST.
L. Allen.
John B. Gavin.

INVENTOR.
John C. Miller
by S. H. Wales
his Atty.

UNITED STATES PATENT OFFICE.

JOHN C. MILLER, OF WEST MERIDEN, CONNECTICUT.

EXTINGUISHER FOR LAMP-BURNERS.

SPECIFICATION forming part of Letters Patent No. 237,766, dated February 15, 1881.

Application filed January 18, 1881. (Model.)

*To all whom it may concern:*

Be it known that I, JOHN C. MILLER, of West Meriden, New Haven county, State of Connecticut, have invented certain new and useful Improvements in Extinguishers for Lamp-Burners, of which the following is a specification.

My invention aims to provide coned lamp-burners with an effective extinguishing device which will not obstruct the draft through the cone; and it relates to that kind of extinguishers which employ a pivoted damper capable of being pressed upon the wick-tube to extinguish the flame; and my invention may be stated to consist in a coned lamp-burner fitted with an extinguishing-damper pivoted on the frame of the burner, with one arm projecting outside of the burner and the other arm rising into the cone, and terminated with a curved damping or extinguishing plate corresponding or approximating to the hollow of the cone, so that the extinguisher lies close to the cone when quiescent, thus avoiding obstruction of draft in the cone, and is capable of being depressed at a downward angle over the top of the wick-tube to extinguish the flame, as hereinafter fully set forth.

Figure 1:
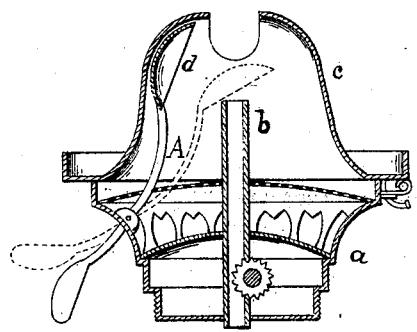
Figure 2:
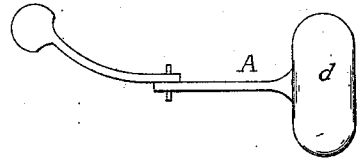

Figure 1 of the annexed drawings presents a vertical section of an ordinary coned lamp-burner provided with my improved extinguisher, and Fig. 2 presents a plan view of the extinguisher removed.

In Fig. 1, *a* indicates the lower part or outer casing of the burner, *b* the wick-tube, and *c* the cone.

A represents my improved extinguishing device, which is in the form of a finger-lever, pivoted about midway in the outer casing of the lamp, and near the periphery thereof. The operating-arm of the lever extends out of the burner and projects prominently from the side thereof, while the other arm rises within the burner close to the interior of the cone, and is terminated with a concave plate or extinguishing-hood, *d*, near the tip of the cone. This extinguishing-hood corresponds to the form of the cone and lies close to the same when in repose, as illustrated, and hence does not obstruct the draft through the burner or interfere with the function of the cone in causing the draft to impinge effectively on the flame, so that a perfect combustion is thus allowed.

The outer arm of the extinguisher is preferably weighted, or is depressed by a spring, so as to tend to constantly gravitate and hold the extinguishing-hood in repose against the interior of the cone.

The extinguishing effect is produced by raising the operating-arm of the lever by the pressure of the finger, or by a rod if the lamp is beyond the reach of the hand, which movement will depress the hood *d* upon the top of the wick, and thus extinguish the flame; and it will be seen that as the pivot of the lever is at a considerable horizontal distance from the wick-tube the extinguisher, in descending, hence moves at a downward angle through and over the flame upon the top of the wick-tube, thus rendering the extinguishment instant and certain, and more so than would be the case were the line of movement upward and lateral. It will thus be seen that by this construction I provide a very effective extinguishing device without interfering with perfect combustion in the burner.

I do not wish to infer any claim of novelty in merely an extinguishing device formed of a pivoted damper movable over the wick-tube, as I am aware that a number of devices of this class have been employed—as, for instance, that shown in Patent No. 103,048, of 1870; but in this case the extinguisher consists of two halves pivoted on each side of the wick-tube, and are inclosed within the casing of the burner, and are not adapted to be operated from without it, but are operated automatically by gravity in the event of the lamp upsetting, and, moreover, have not the relative arrangement with the cone of a coned burner, as shown in my device.

I am also aware that sliding devices have been employed movable horizontally over the top of the wick-tube; but these obstruct the burner and require a special form of cone of a large broad shape, which is unfavorable to good combustion, whereas my invention does not obstruct the burner and allows of the use of the ordinary cone of high tapering and contracted shape, which is the best form for good combustion.

I am also aware of Patent No. 70,856, of 1867, and the English Patent No. 1,274 of 1865; but these are also distinguished from my invention for similar reasons.

What I claim as my invention is—

A coned lamp-burner provided with an extinguishing device consisting of a finger-lever pivoted in the outer portion of the burner, with one arm projecting out of the burner and the other arm rising within the cone and terminated with an extinguishing-cap corresponding to the form of the cone, and arranged to lie close to the same when in repose, and adapted to be projected down upon the wick-tube when the outer or operating arm is raised, substantially as herein shown and described.

JOHN C. MILLER.

Witnesses:
GEO. W. SMITH,
JNO. S. JUDGE.